Aug. 7, 1945.  C. C. WHITTAKER  2,381,326
ELECTRORESPONSIVE INDICATOR
Filed July 20, 1943

WITNESSES:
Alice L. Horrell
Nw. C. Groome

INVENTOR
Charles C. Whittaker.
ATTORNEY

UNITED STATES PATENT OFFICE 2,381,326

ELECTRORESPONSIVE INDICATOR

Charles C. Whittaker, Pittsburgh, Pa., assignor to Westinghouse Electric Corporation, East Pittsburgh, Pa., a corporation of Pennsylvania Application July 20, 1943, Serial No. 495,444

1 Claim. (Cl. 171—95)

The invention relates to electroresponsive indicating instruments and more particularly to a device for indicating the magnitude of an electrical quantity of an electric circuit.

Although not limited thereto the invention was designed primarily for use on an electric locomotive where it is important that the load on the generator be maintained within predetermined limits, or that an excess load should be watched and reduced as soon as practicable.

Accordingly, it is an object of the invention to provide an electroresponsive indicator of simple and rugged design to indicate load conditions or other characteristics of an electric circuit.

Figure 1:
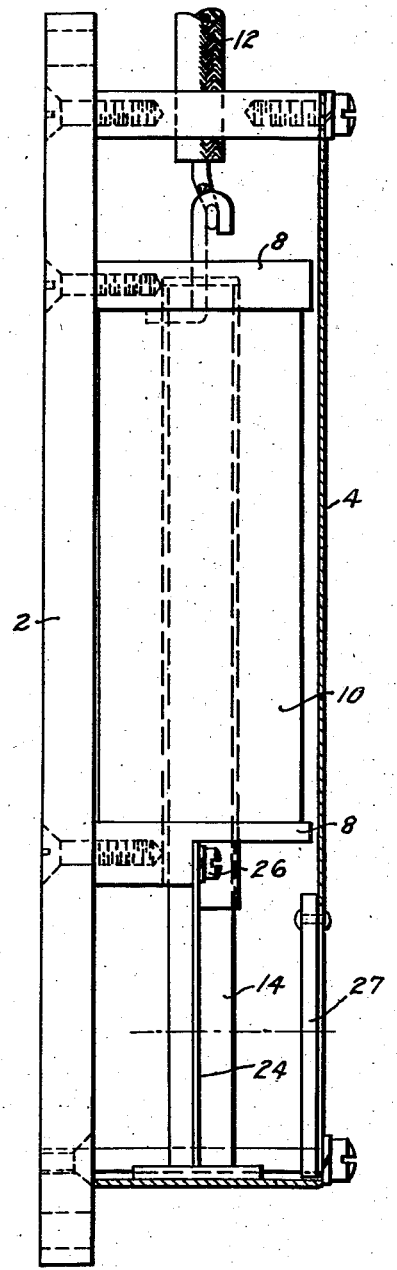
Figure 2:
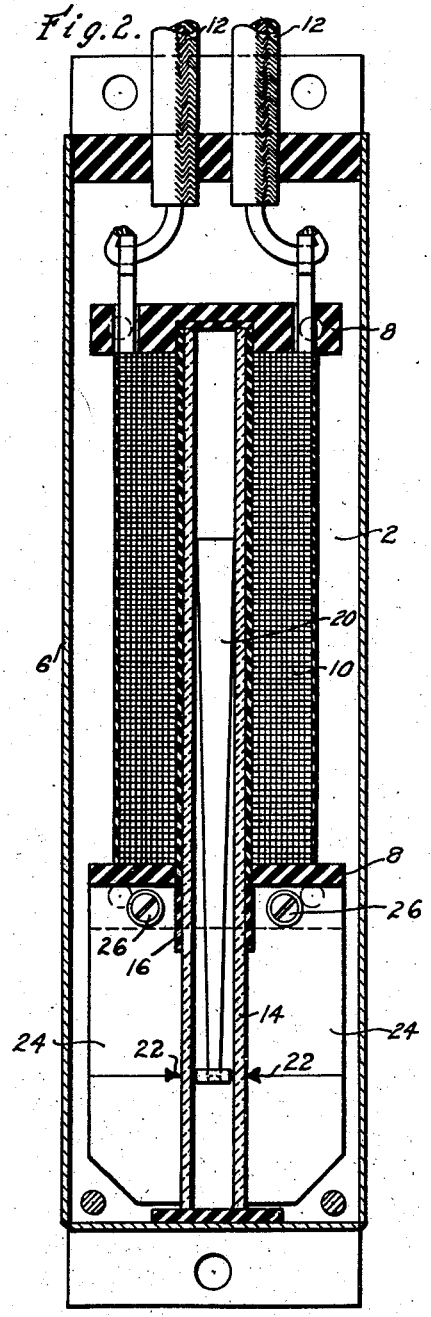

Other objects of the invention will be apparent from the following description considered in connection with the accompanying drawing, in which;

Figure 1 is a view in side elevation, partly in section, of an indicator constructed in accordance with the invention; and Fig. 2 is a view in vertical section taken at right angles to the showing of Fig. 1.

Referring more specifically to the drawing, the indicator includes a base 2 having front and side walls 4 and 6, respectively, which encloses a pair of brackets 8 for supporting a solenoid winding 10.

Connection to the solenoid winding may be made through conductors 12 from the circuit to be measured in a usual manner. In the case of an electric locomotive, the conductors 12 are connected to spaced points on the generator cable to energize the winding in accordance with the IR drop in the shunted section of cable.

A tube 14 of glass or other transparent material extends up through the core of the solenoid, and is surrounded by an insulating tube 16 provided principally for cushioning the transparent tube 14. Further cushioning material is supplied at the bottom of the tube 14 to close it, and the upper end of the tube is closed by the upper bracket 8.

The armature of the solenoid comprises a rod 20 of high permeability iron, such as is known to the trade under the name Hypernik. The armature 20 is tapered from a large diameter which would normally be in the position shown in Fig. 2 when the solenoid is energized, and a lower relatively small diameter visible through the lower portion of the transparent tube 14.

An indicating disc of a diameter to fit within the core of tube 14 relatively closely cooperates with index marks 22 carried by index plates 24 secured by screws 26 in an offset portion of the lower bracket 8. A transparent window 27 (Fig. 1) is provided in the front wall 4 to permit observation of the armature position.

When the device is calibrated so that the armature 20 floats substantially in the position shown at a predetermined load current, any variation in such current will cause the armature to rise or drop below the index marks 22, thereby indicating to the operator whether the load current is above or below normal. In this floating action the movement of the armature is dampened because the indicating disc substantially fills the tube 14 with a loose sliding fit, and the tube is closed at both ends, as previously described.

Since the heat radiation from the solenoid winding 10 and the copper cable from which it is energized are substantially the same, errors due to temperature coefficient of resistance are, for practical purposes, eliminated.

By the construction described an unusually rugged and efficient indicator is provided which is inexpensive to manufacture and simple in operation.

Quite obviously modifications may be made in the invention without departing from the scope thereof and it is intended that it be limited only by the scope of the appended claim.

I claim as my invention:

In an electrical measuring device, a vertically mounted solenoid to be energized in accordance with a quantity to be measured, a transparent tubular core for said solenoid having a portion depending therefrom, closures for the end of said core, an armature disposed in said core to be magnetically suspended by said solenoid and having an enlarged upper portion within the solenoid tapering to a substantially smaller lower portion visible through the depending portion of said core, and an indicating disc coaxially mounted on said lower portion, the diameter of said disc being such as to guide the reciprocation of said armature and damp the vertical movement thereof.

CHARLES C. WHITTAKER.